United States Patent [19]

Wurr

[11] Patent Number: 4,748,054
[45] Date of Patent: May 31, 1988

[54] METHOD OF PROVIDING COLOR ON GLASS

[76] Inventor: Penelope J. Wurr, 15 Morshead Mansions, Morshead Road, London W9, England

[21] Appl. No.: 3,037

[22] Filed: Jan. 13, 1987

[51] Int. Cl.⁴ .......................... B05D 3/10; B05D 3/12; B05D 5/06; B05D 1/32
[52] U.S. Cl. .................................... 427/259; 427/260; 427/264; 427/266
[58] Field of Search ............... 427/266, 275, 259, 260, 427/264, 265, 287; 430/295; 428/210

[56] References Cited

U.S. PATENT DOCUMENTS

| | | | |
|---|---|---|---|
| 256,916 | 4/1882 | Newsham | 427/287 X |
| 1,207,972 | 12/1916 | Miksch et al. | 427/275 X |
| 1,226,957 | 5/1917 | Evans | 427/275 |
| 1,983,720 | 12/1934 | West | 427/275 X |
| 3,499,781 | 3/1970 | Krueckel | 430/295 |

FOREIGN PATENT DOCUMENTS 505183  5/1939  United Kingdom .

Primary Examiner—Evan K. Lawrence
Attorney, Agent, or Firm—Roylance, Abrams, Berdo & Goodman

[57] ABSTRACT

A method of providing different colored layers of paint on glass, which method comprises roughening a surface of the glass, applying a first lot of soluble resist to predetermined areas of the roughened glass, then applying a first color paint to the glass, drying the paint, washing off the first lot of soluble resist to expose unpainted roughened glass, drying the glass, applying a second lot of soluble resist on top of some of the first colored paint and on top of some of the exposed unpainted roughened glass, applying a second color paint to the glass, and washing off the second lot of soluble resist to leave the glass with at least one area where the first and the second colors are overlaid, at least one area where the roughened glass only has the first color, and at least one area where the roughened glass only has the second color.

5 Claims, No Drawings

METHOD OF PROVIDING COLOR ON GLASS

This invention relates to a method of providing colour on glass.

There is currently a demand for different types of glass which are provided with one or more coloured areas. For example, the glass can be in the form of a drinking glass, an ash tray, a vase or sheet glass for use as table tops or windows. At the present time, the glass is usually provided with the desired colour by means of a silk screening process. The silk screening is such that the colour appears to be applied to the surface of the glass and is often opaque.

It is an aim of the present invention to provide an alternative method to the known silk screening, which method causes the colour to appear to be integral with the glass whilst leaving the glass still substantially translucent.

Accordingly, this invention provides a method of providing different coloured layers of paint on glass, which method comprises roughening a surface of the glass, applying a first lot of soluble resist to predetermined areas of the roughened glass, then applying a first colour paint to the glass, drying the paint, washing off the first lot of soluble resist to expose unpainted roughened glass, drying the glass, applying a second lot of soluble resist on top of some of the first coloured paint and on top of some of the exposed unpainted roughened glass, applying a second colour paint to the glass, and washing off the second lot of soluble resist to leave the glass with at least one area where the first and second colours are overlaid, at least one area where the roughened glass only has the first colour, and at least one area where the roughened glass only has the second colour.

The glass can be any type of glassware and the glass can be for domestic or industrial use. By way of example only it is mentioned that the glass may be a drinking glass, an ash tray, a vase or a sheet glass.

Preferably, the surface of the glass is roughened by sandblasting. Howver, if desired, the surface of the glass may be roughened by acid etching, grinding or other methods.

When the glass is to be in the form of a drinking glass or other article that is likely to be in contact with the lips of a person, then the paint will preferably be a non-toxic paint.

Usually, the glass will be masked in areas where the glass is not to be sandblasted. The masking may be effected with tape or with an adhesive.

The paint is preferably diluted with a solvent.

Preferably, the paint is an enamel. A presently preferred enamel is the enamel that is especially made for glass by Messrs Keeps Limited and sold under the trade mark of "Flamboyant Enamel."

The glass may be cleaned with a liquid and then dried. The liquid is usually water, in which case the cleaned glass is usually air dried. The glass can of course be cleaned with liquids other than water.

The paint is preferably applied with a plastics foam material. The foam material is preferably soft.

The excess paint that is removed may also be removed with a plastics foam material. Again, the material is preferably soft.

The colours may be any desired colours. The intensity of the colours can be varied by the amount of solvent that is mixed with the paint.

The paint on the glass will usually be air dried. The painted glass may be baked at a low temperature if desired, depending upon the paint used. However, the baking step has a tendency to alter the pigments and the baking is not always necessary or desirable for some paints.

The method of the invention may be repeated as desired with as many different colours as may be required.

The soluble resist is preferably a water soluble resist so that it can be washed off with water. However, other types of resist may be employed if desired, it then being necessary to effect the washing off with an appropriate solvent.

Some examples with now be given in order to facilitate a full and complete understanding of the invention.

EXAMPLE 1

A piece of glass was taken and it was masked with tape in areas where sandblasting was to be prevented. The glass was then sandblasted and subsequently washed to remove the glass dust. The washed glass was left to dry in air, although it could alternatively have been dried with a cloth.

When the glass was dry, a non-toxic enamel which had been diluted with a solvent which was applied to the glass with a piece of soft plastics foam. Before the enamel had dried, the excess enamel was removed with another piece of soft plastics foam to leave a thin layer of enamel adhered to the roughened surface but not to the non-sandblasted glass which was plain and clear.

Only one colour was applied to the glass although this colour could be any desired colour.

The resulting glass was provided with a pleasing coloured area.

EXAMPLE 2

The above Example 1 was repeated. As a final step, the glass was baked at a low heat and, again, glass having a pleasing coloured appearance was obtained. During the baking process, care was taken not to bake at too high a temperature and so adversely affect the coloured pigments.

EXAMPLE 3

A piece of glass was taken and it was masked with adhesive in areas where sandblasting was not to take place. The glass was then sandblasted and subsequently washed to remove glass dust caused by the sandblasting. The washed glass was then left to dry.

A water soluble resist was then applied to the dried glass in selected areas where sandblasting had occurred. The water soluble resist was preferably that known as sugar lift which is a saturated solution of sugar. Alternatively, a water soluble resist in the form of gum arabic can be used.

Paint was applied where desired and allowed to dry. The glass was then washed to remove the water soluble resist and to leave a combination of the painted colour on the glass and white areas formed by the sandblasting.

In order to obtain layers of colours, a second amount of resist was applied on top of the first colour. Painting with another colour then took place and the second amount of resist was washed off with water. There were obtained two colours overlaid and areas of single colour. Where the two colours were overlaid, the resulting colour was a combination of the two original colours. The glass was thus provided with different coloured areas of a pleasing appearance. The process of applying resist and subsequently painting can be repeated as desired with various colours to obtain any desired final colour combination.

EXAMPLE 4

A piece of flat sheet glass was provided. The glass was sand blasted and then a required design was screened through a silk screen onto the glass. The design was allowed to dry. A coating of paint (i.e. enamel) was applied and was allowed to dry. Unwanted resist was washed off. Further resist was re-applied from a new silk screen onto the glass. A different colour paint was then applied. The procedure of washing off unwanted resist, re-applying further resist and applying a different colour paint was repeated until the required coloured design was completed. the advantage of using flat sheet glass is that the resist can be screened through the silk screen before the application of the paint, which means that a design can be repeated at very little cost, and quickly, with any number of colour overlays.

It is to be appreciated that the foregoing Examples have been given for the purposes of illustration only and that modifications may be effected. Thus, for example, the given order of applying paint and resist can be varied. Also, any desired mask can be employed before the sandblasting. Thus, the mask may be an elastic band, a sticky level, or a spray. Several masks can of course be used on one piece of glass.

I claim:

1. A method of providing different coloured layers of paint on glass, which method comprises roughening a surface of the glass, applying a first lot of soluble resist to predetermined areas of the roughened glass, then applying a first colour paint to the glass, drying the paint, washing off the first lot of soluble resist to expose unpainted roughened glass, drying the glass, applying a second lot of soluble resist on top of some of the first coloured paint and on top of some of the exposed unpainted roughened glass, applying a second colour paint to the glass, and washing off the second lot of soluble resist to leave the glass with at least one area where the first and the second colours are overlaid, at least one area where the roughened glass only has the first colour, and at least one area where the roughened glass only has the second colour.

2. A method according to claim 1 in which the surface of the glass is roughened by sandblasting.

3. A method according to claim 1 in which the surface of the glass is roughened by acid etching.

4. A method according to claim 1 in which the paint is diluted with a solvent.

5. A method according to claim 1 in which the soluble resist is a water soluble resist so that it can be washed off with water.

* * * * *